United States Patent
Zheng et al.

(10) Patent No.: US 11,536,340 B2
(45) Date of Patent: Dec. 27, 2022

(54) SUPERIMPOSED OPPOSING WAVE SPRING (71) Applicant: ZHEJIANG LISHENG SPRING CO., LTD., Wenzhou (CN)

(72) Inventors: Leyong Zheng, Wenzhou (CN); Zhou Liu, Wenzhou (CN); Xujie Yu, Wenzhou (CN)

(73) Assignee: ZHEJIANG LISHENG SPRING CO., LTD, Wenzhou (CN)

( * ) Notice: Subject to any disclaimer, the term of this patent is extended or adjusted under 35 U.S.C. 154(b) by 7 days.

(21) Appl. No.: 17/272,764

(22) PCT Filed: May 8, 2020

(86) PCT No.: PCT/CN2020/089235
§ 371 (c)(1),
(2) Date: Mar. 2, 2021

(87) PCT Pub. No.: WO2021/189607
PCT Pub. Date: Sep. 30, 2021

(65) Prior Publication Data
US 2022/0196100 A1    Jun. 23, 2022

(30) Foreign Application Priority Data

Mar. 25, 2020 (CN) .......................... 202010219409.8

(51) Int. Cl.
*F16F 1/04* (2006.01)
(52) U.S. Cl.
CPC .......... *F16F 1/048* (2013.01); *F16F 2226/00* (2013.01); *F16F 2234/00* (2013.01)
(58) Field of Classification Search
CPC ......... F16F 1/048; F16F 2234/06; F16F 1/328
(Continued)

(56) References Cited

U.S. PATENT DOCUMENTS 2,982,323 A * 5/1961 Vossloh .................. F16F 1/048
                                                              267/180
5,639,074 A    6/1997 Greenhill et al.
(Continued)

FOREIGN PATENT DOCUMENTS

CN          202381610 U       8/2012
CN          204025469 U       12/2014
(Continued)

OTHER PUBLICATIONS

EPO machine translation FR 2148865. (Year: 1971).*
(Continued)

*Primary Examiner* — Thomas J Williams
(74) *Attorney, Agent, or Firm* — Taft Stettinius & Hollister LLP; Ryan O. White; Derek B. Lavender (57) ABSTRACT

The present application provides a superimposed opposing wave spring that has a plurality of superimposed-layer wave spring units, wherein each layer in each superimposed-layer wave spring unit is formed by spirally bending around an axis into a wave shape, and waveforms of the respective layers in each superimposed-layer wave spring unit are arranged to overlap each other. At least one connection spring part, which connects two adjacent superimposed-layer wave spring units that are stacked one above the other, so that the two adjacent superimposed-layer wave spring units respectively have a first wave trough and a second wave crest that are abutting each other with opposing apexes, and respectively have a first wave crest and a second wave trough that are arranged across from each other in an upper position and a lower position.

9 Claims, 7 Drawing Sheets

(58) Field of Classification Search
USPC .................................................. 267/161, 162
See application file for complete search history.

(56) References Cited

U.S. PATENT DOCUMENTS

| | | | |
|---|---|---|---|
| 6,068,250 A | | 5/2000 | Hawkins et al. |
| 2022/0196100 A1* | | 6/2022 | Zheng .................... F16F 1/328 |

FOREIGN PATENT DOCUMENTS

| | | | | |
|---|---|---|---|---|
| CN | 205321433 U | * | 6/2016 | |
| CN | 107387624 A | | 11/2017 | |
| DE | 102010043703 A1 | * | 5/2012 | .............. F16F 1/328 |
| DE | 102019101604 A1 | * | 7/2020 | |
| FR | 2148865 A5 | * | 8/1971 | .............. F16F 1/328 |
| JP | 08021471 A | | 1/1996 | |

OTHER PUBLICATIONS

PCT/ISA/210; International Search Report for PCT/CN2020/089235; 5 Pages.
PCT/ISA/237; Written Opinion of the International Search Authority for PCT/CN2020/089235; 4 Pages.

* cited by examiner

SUPERIMPOSED OPPOSING WAVE SPRING

This application is a U.S. National Phase of International Application No. PCT/CN2020/089235 filed on May 8, 2020, which claims the benefit of CN202010219409.8 filed Mar. 25, 2020, the contents of which are herein incorporated by reference in entirety.

TECHNICAL FIELD

The present application relates to the technical field of wave springs, and in particular relates to a superimposed opposing wave spring.

BACKGROUND

An opposing wave spring is formed by spirally bending a strip-shaped flat metal wire around an axis, each circle of the opposing wave spring is provided with a plurality of wave crests and wave troughs. As compared with an ordinary spiral compression spring, an opposing wave spring has an advantage of occupying only half or less of axial space under a same load, and is widely used in industries such as mechanical manufacturing, hydraulic equipments and so on.

Figure 7:
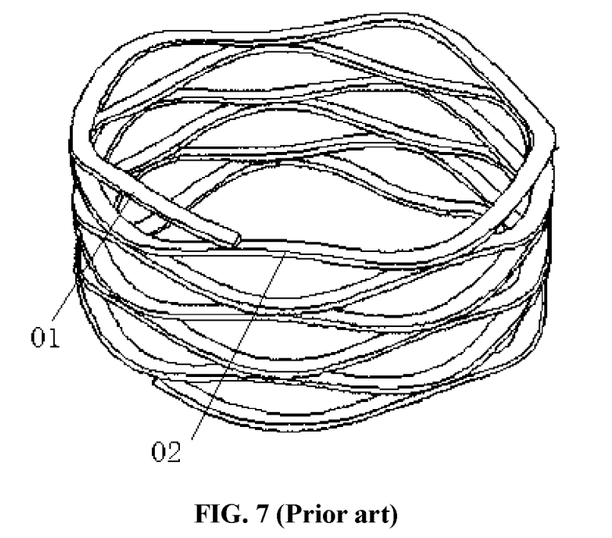
FIG. 7 is a perspective view of an opposing wave spring in the prior art.

A traditional opposing wave spring is shown in FIG. 7, the waveform thereof is formed by bending obliquely downwards, a lowest point of a right-side end of a first half wave 01 extends to a wave crest of a second half wave 02 in the next layer, so that waveform heights thereof are different when the waveform is closed, namely, verticality is poor, and the verticality has a large influence on performance of the wave spring.

Figure 8:
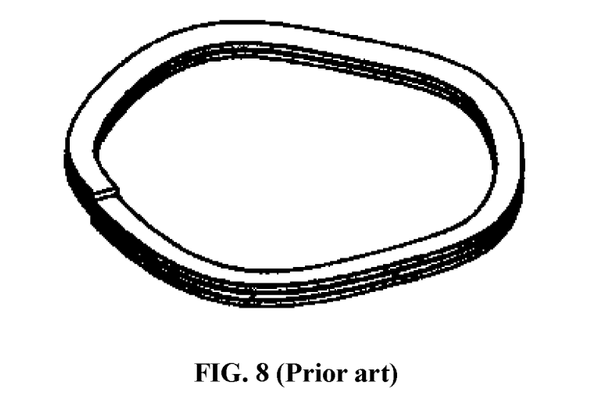
FIG. 8 is a perspective view of a superimposed-layer wave spring in the prior art.

Another superimposed-layer wave spring is shown in FIG. 8, a metal wire of the superimposed-layer wave spring forms each layer thereof by spirally bending around an axis into a wave shape, and waveforms of the respective layers are arranged to overlap each other, namely, wave crests of the respective layers are correspondingly fitting to each other, and wave troughs of the respective layers are correspondingly fitting to each other, although the verticality of the superimposed-layer wave spring is better, the available stroke of the superimposed-layer wave spring is short, and the elastic performance thereof is poor. Therefore, it is urgent to design an opposing wave spring which has good verticality, and has better elastic performance and a higher available stroke under the condition of ensuring greater stiffness.

SUMMARY OF THE INVENTION

Therefore, the technical problem to be solved by the present application is to overcome the defect that opposing wave springs in the prior art cannot maintain good verticality and good elastic performance at the same time, so as to provide a superimposed opposing wave spring with good verticality and a high available stroke, and having better elastic performance under the condition of ensuring greater stiffness.

Thus, the present application provides a superimposed opposing wave spring which comprises a plurality of superimposed-layer wave spring units and connection spring parts, wherein each layer in each superimposed-layer wave spring unit is formed by spirally bending around an axis into a wave shape, and waveforms of the respective layers in each superimposed-layer wave spring unit are arranged to overlap each other; at least one connection spring part, which connects two adjacent superimposed-layer wave spring units that are stacked one above the other, so that the two adjacent superimposed-layer wave spring units respectively have a first wave trough and a second wave crest that are abutting each other with opposing apexes, and respectively have a first wave crest and a second wave trough that are arranged across from each other in an upper position and a lower position.

The connection spring part is disposed between the first wave crest and the second wave trough, which are arranged across from each other, of the two adjacent superimposed-layer wave spring units, one end of the connection spring part is connected to the first wave trough at a bottom layer of the upper superimposed-layer wave spring unit, and the other end of the connection spring part is connected to the second wave crest at a top layer of the lower superimposed-layer wave spring unit.

The plurality of the superimposed-layer wave spring units and the connection spring part are integrally formed by winding a same flat metal wire.

The connection spring part comprises a first segment in a fitting connection with the bottom layer of the upper superimposed-layer wave spring unit, a second segment in a fitting connection with the top layer of the lower superimposed-layer wave spring unit, and an oblique line segment connecting the first segment and the second segment.

The oblique line segment is connected with both the first segment and the second segment at connection portions that have arc transition.

The first segment and the second segment have lengths that are both ⅙-¼ of a length of one wave of the wave shape.

The connection spring part has a flat line shape.

The connection spring part has a half-wave shape closely fitting to the upper or lower superimposed-layer wave spring unit.

The wave shape is sinusoidal.

Each layer in each superimposed-layer wave spring unit comprises at least two sine waves.

The technical scheme of the present application has the following advantages:

1. The present application provides a superimposed opposing wave spring which comprises a plurality of superimposed-layer wave spring units and connection spring parts, the inventor skillfully designs a configuration wherein two adjacent superimposed-layer wave spring units, which are stacked one above the other, are interconnected by a connection spring part, and the two adjacent superimposed-layer wave spring units respectively have a first wave trough and a second wave crest that are abutting each other with opposing apexes, and respectively have a first wave crest and a second wave trough that are arranged across from each other in an upper position and a lower position, so that the superimposed opposing wave spring has larger elastic performance and a higher available stroke while ensuring better verticality; in addition, under the condition that the thickness of the entire material is not changed, the stiffness of the superimposed opposing wave spring can be improved by increasing the number of layers of the superimposed-layer wave spring units, and by changing the number of layers of the superimposed-layer wave spring units, multiple superimposed-layer wave spring units with different respective number of layers therein can be connected through the connection spring parts, so that various wave springs with different stiffness can be produced, and thus the wave springs can have variable stiffness characteristics to meet different needs of customers.

2. The present application provides a superimposed opposing wave spring, wherein the connection spring part is disposed between the first wave crest and the second wave trough, which are arranged across from each other, of the two adjacent superimposed-layer wave spring units, one end of the connection spring part is connected to a first wave trough at a bottom layer of an upper superimposed-layer wave spring unit, and the other end of the connection spring part is connected to a second wave crest at a top layer of a lower superimposed-layer wave spring unit, the structure of the above-mentioned connection spring part enables the plurality of the superimposed-layer wave spring units and the connection spring part to be integrally formed by winding a same flat metal wire, in this way, processing is fast and convenient, which greatly improves the production efficiency and reduces the production cost.

3. The present application provides a superimposed opposing wave spring, wherein the connection spring part comprises a first segment in a fitting connection with a bottom layer of an upper superimposed-layer wave spring unit, a second segment in a fitting connection with a top layer of a lower superimposed-layer wave spring unit, and an oblique line segment connecting the first segment and the second segment, in this way, the connection spring part is arranged in a wave shape, thereby increasing the elastic performance thereof.

4. The present application provides a superimposed opposing wave spring, wherein the connection spring part has a half-wave shape closely fitting to the upper or lower superimposed-layer wave spring unit, the connection spring part with the half-wave shape can increase elastic performance of the superimposed opposing wave spring.

BRIEF DESCRIPTION OF THE DRAWINGS

In order to more clearly illustrate the technical solutions in the specific embodiments of the present application or in the prior art, the accompanying drawings used in describing the specific embodiments or the prior art will be briefly introduced below, and apparently, the accompanying drawings mentioned in the following description are just some embodiments of the present application, and other drawings can be derived by a person skilled in the art from these drawings without expenditure of creative efforts.

Description of the reference numerals: 01. first half wave; 02. second half wave; 1. first superimposed-layer wave spring unit; 11. first wave trough; 12. first wave crest; a1, first layer; a2, second layer; 2. second superimposed-layer wave spring unit; 21. second wave crest; 22. second wave trough; b1, third layer; b2, fourth layer; 3. connection spring part; 31. first segment; 32. second segment; 33. oblique line segment.

DETAILED DESCRIPTION OF EMBODIMENTS

The technical solutions of the present application will be described clearly and completely with reference to the accompanying drawings, and apparently, the described embodiments are only a part of, but not all of, the embodiments of the present application. All other embodiments obtained by a person skilled in the art based on the embodiments described in the present application without expenditure of creative efforts belong to the protection scope of the present application.

In the description of the present application, it should be noted that terms such as "center", "upper", "lower", "left", "right", "vertical", "horizontal", "inner", "outer" indicate orientations or positional relationships based on the orientations or positional relationships shown in the drawings, and are only for convenience of description and simplification of description, not for indicating or implying that the device or element referred to must have a particular orientation or must be constructed or operated in a particular orientation, thus, these terms should not be construed as a limitation to the present application. Furthermore, terms such as "first", "second" and "third" are used for descriptive purposes only and cannot be construed as indicating or implying relative importance.

In the description of the present application, it should be noted that, unless explicitly defined or restricted otherwise, terms such as "mount", "interconnect", "connect" should be understood in a broad sense, for example, it can be a fixed connection, a detachable connection, or an integral connection; it can be a mechanical connection or an electrical connection; it can be connected directly, or it can be connected indirectly through an intervening medium, or it can be an internal communication between two elements. For a person skilled in the art, the specific meaning of the above terms in the present application can be understood according to specific situations thereof.

In addition, the technical features involved in different embodiments of the present application described below can be combined with each other as long as they do not conflict with each other.

EMBODIMENTS

Figure 1:
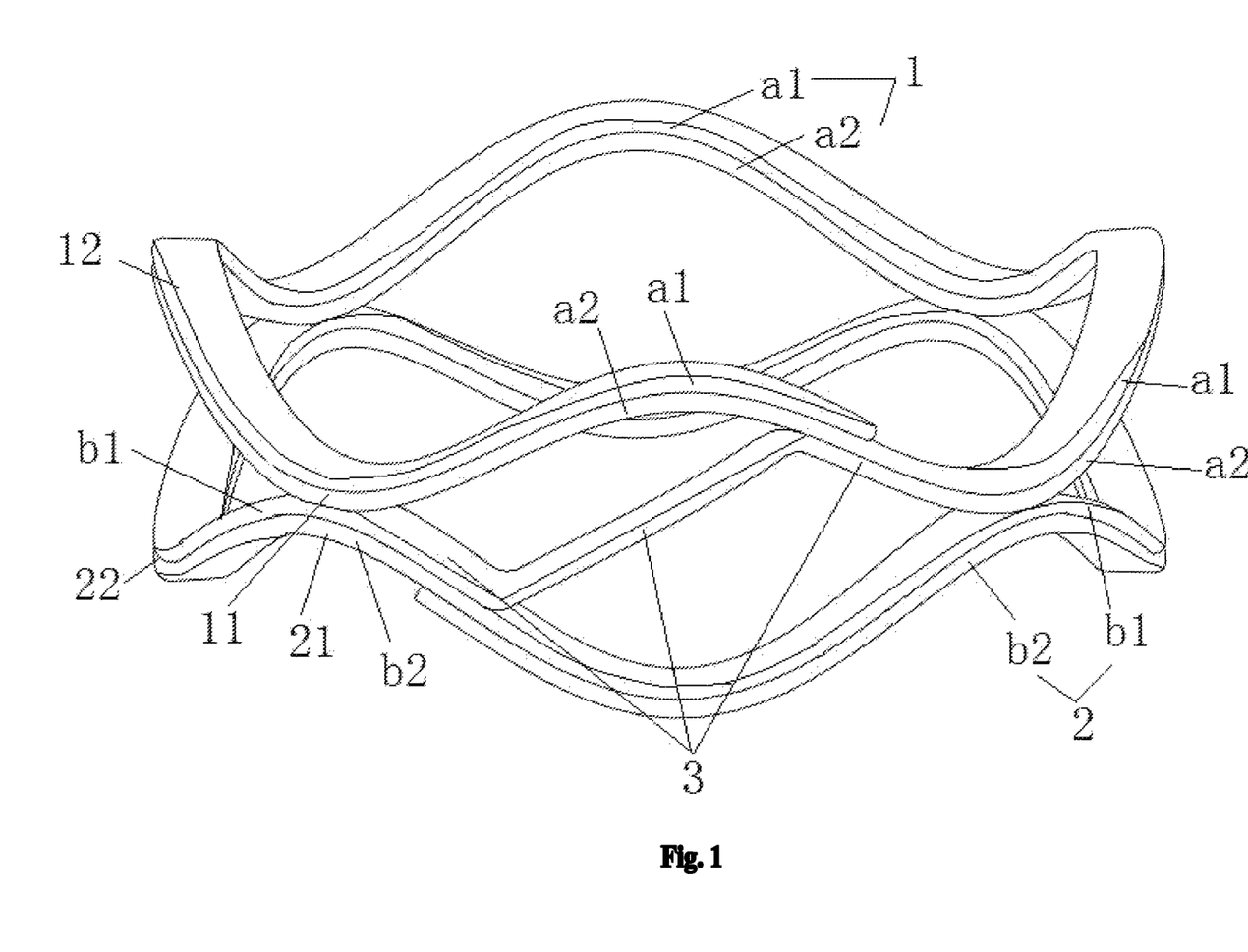
FIG. 1 is a perspective view of a superimposed opposing wave spring of the present application.
Figure 2:
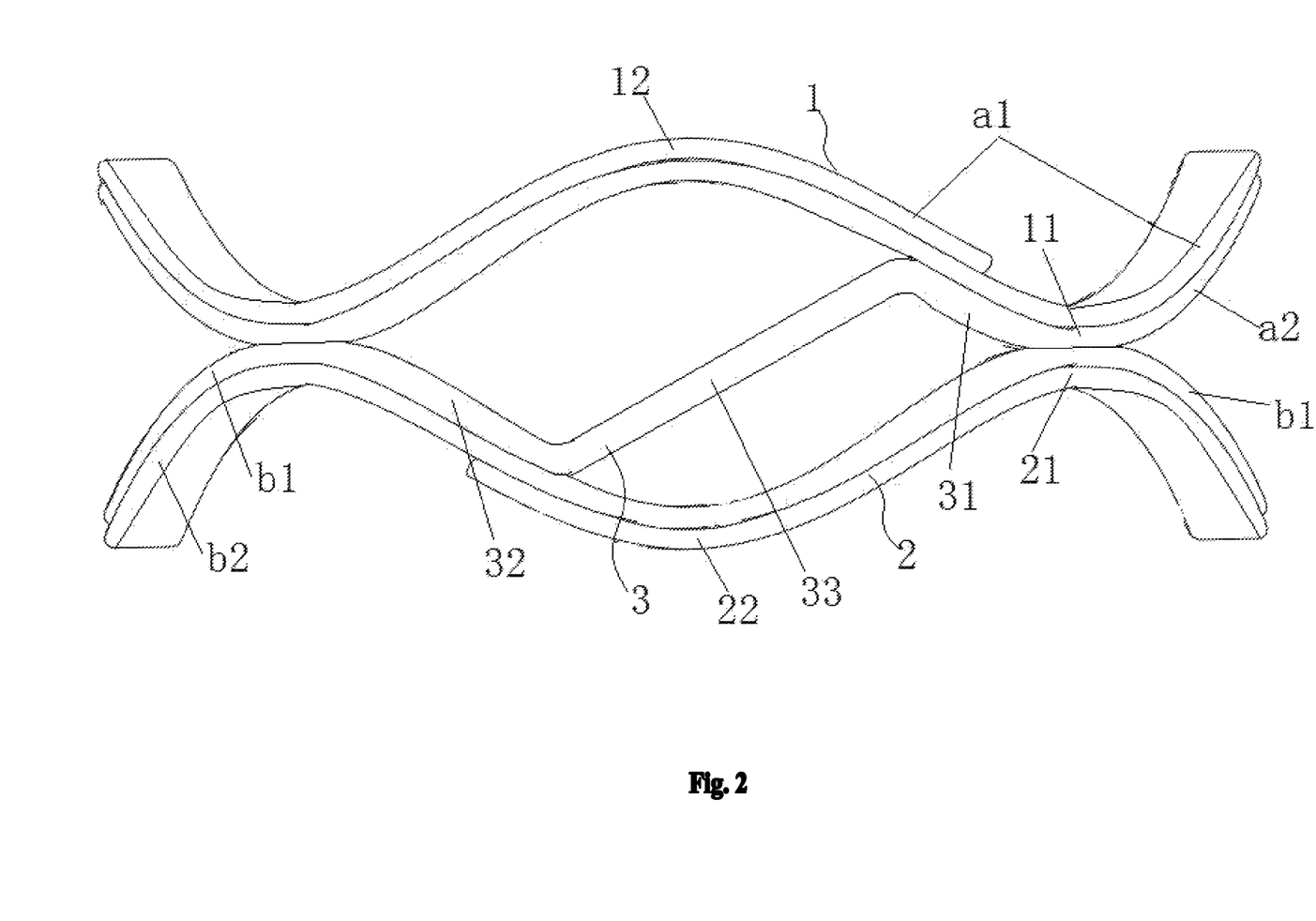
FIG. 2 is a front view of FIG. 1.

The present embodiment provides a superimposed opposing wave spring, as shown in FIG. 1 and FIG. 2, including a first superimposed-layer wave spring unit 1, a second superimposed-layer wave spring unit 2, and a connection spring part 3.

As shown in FIG. 1 and FIG. 2, the first superimposed-layer wave spring unit 1 and the second superimposed-layer wave spring unit 2 are abutting each other with opposing apexes, each of the superimposed-layer wave spring units is formed by spirally bending around an axis, the first superimposed-layer wave spring unit 1 has a first layer a1 and a second layer a2, the second superimposed-layer wave spring unit 2 has a third layer b1 and a fourth layer b2, wherein a tail end of the first layer a1 is integrally connected with a start end of the second layer a2, a tail end of the third layer b1 is integrally connected with a start end of the fourth layer b2, each layer is in a wave shape, the wave shape is sinusoidal, and each layer includes three sine waves. Waveforms of the respective layers in each superimposed-layer wave spring unit are arranged to overlap each other, and a first wave trough 11 of the first superimposed-layer wave spring unit 1 and a second wave crest 21 of the second superimposed-layer wave spring unit 2 are abutting each other with opposing apexes, a first wave crest 12 of the first superimposed-layer wave spring unit 1 and a second wave trough 22 of the second superimposed-layer wave spring unit 2 are arranged across from each other in an upper position and a lower position.

The connection spring part 3 is disposed between the first wave crest 12 and the second wave trough 22, which are arranged across from each other, of two adjacent superimposed-layer wave spring units, one end of the connection spring part 3 is connected to the first wave trough 11 at a bottom layer of the upper superimposed-layer wave spring unit, and the other end of the connection spring part 3 is connected to the second wave crest 21 at a top layer of the lower superimposed-layer wave spring unit, in the present embodiment, one end of the connection spring part 3 is connected to the first wave trough 11 of the second layer a2, and the other end of the connection spring part 3 is connected to the second wave crest 21 of the third layer b1. The connection spring part 3 comprises a first segment 31 connected with the first wave trough 11 of the second layer a2, a second segment 32 connected with the second wave crest 21 of the third layer b1, and an oblique line segment 33 connecting the first segment 31 and the second segment 32, the first segment 31 and the second segment 32 have lengths that are both ⅙-¼ of a length of one wave of the wave shape, the oblique line segment 33 is connected with both the first segment 31 and the second segment 32 at connection portions that have arc transition. In the present embodiment, the plurality of the superimposed-layer wave spring units and the connection spring part 3 are integrally formed by winding a same flat metal wire.

As alternative embodiments, the total number of the superimposed-layer wave spring units may be 2, 3, 4 or more, and the number of layers in each superimposed-layer wave spring unit can be 2, 3, 4 or more.

As alternative embodiments, the number of sine waves in each layer of the superimposed-layer wave spring unit can be 2, 3, 4 or more.

Figure 3:
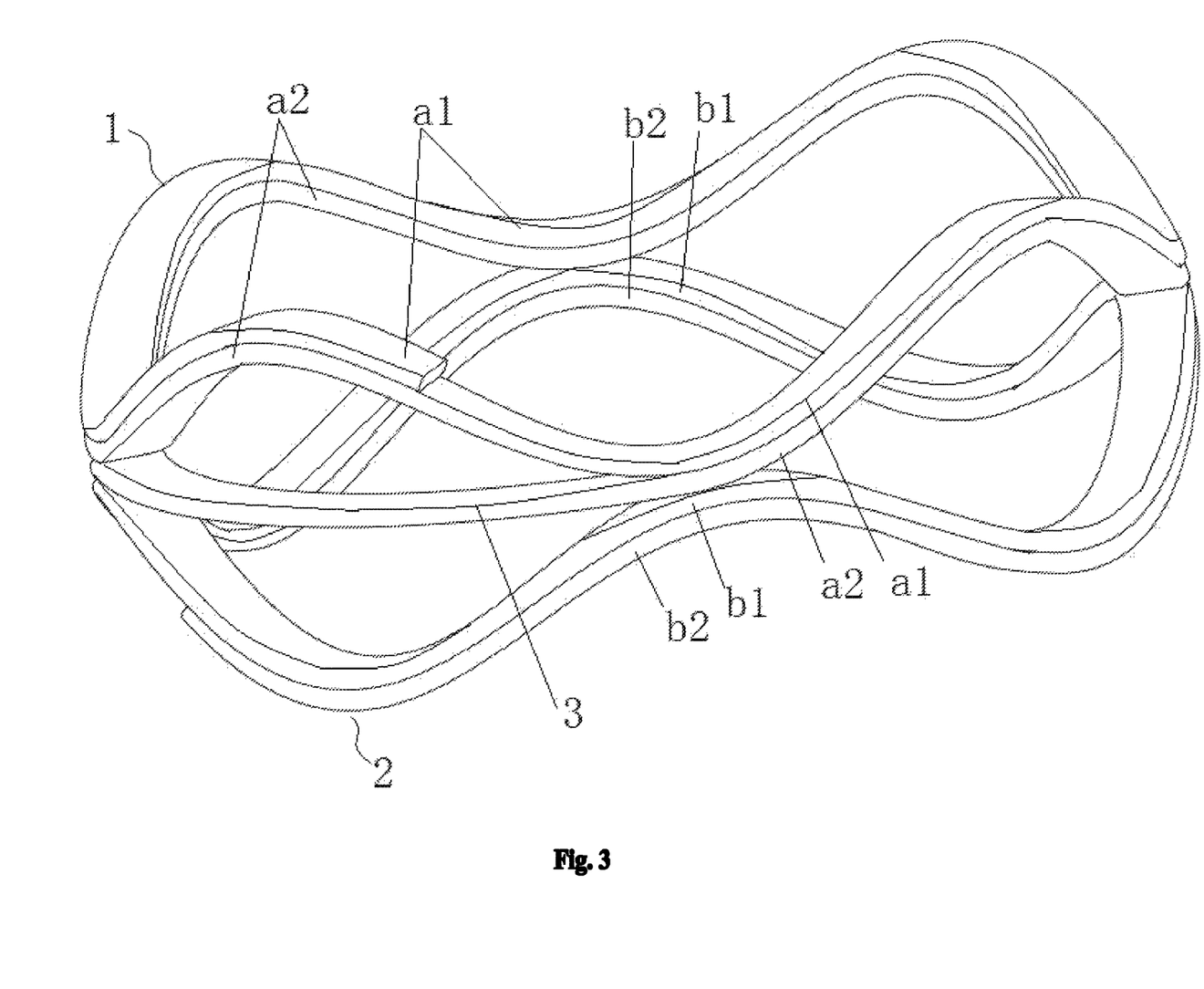
FIG. 3 is a perspective view of a second embodiment of a superimposed opposing wave spring of the present application.
Figure 4:
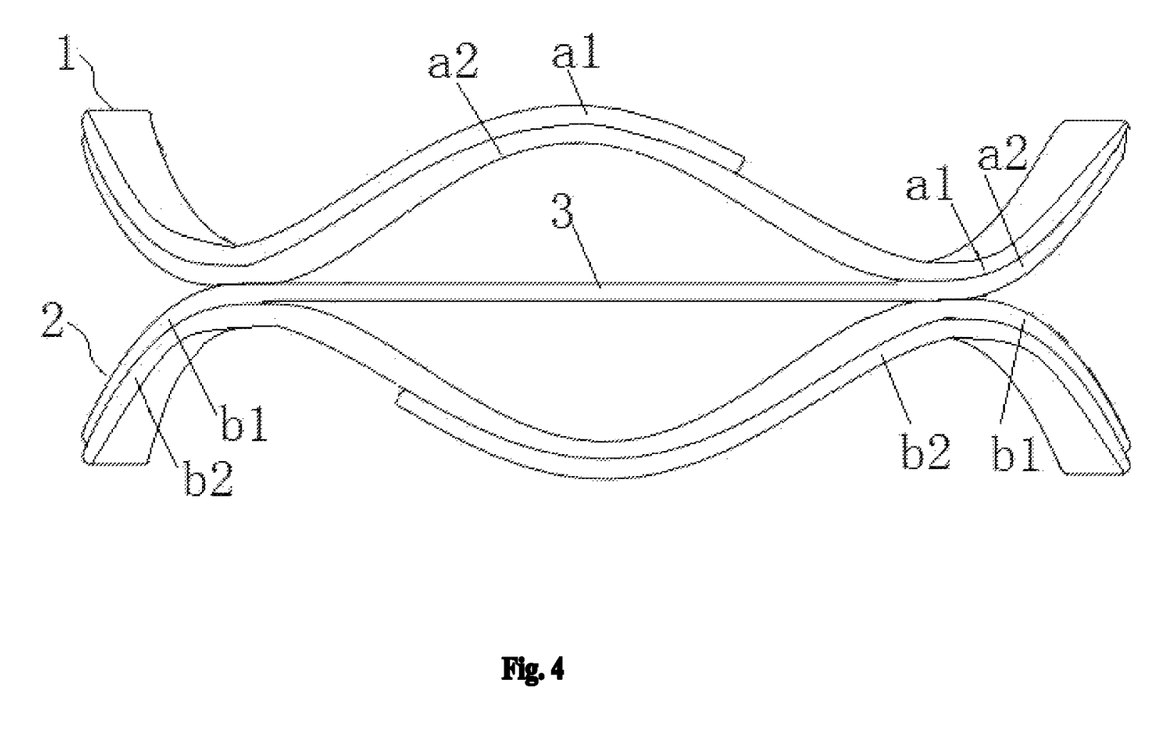
FIG. 4 is a front view of FIG. 3.

As an alternative embodiment, as shown in FIG. 3 and FIG. 4, the connection spring part 3 has a flat line shape.

Figure 5:
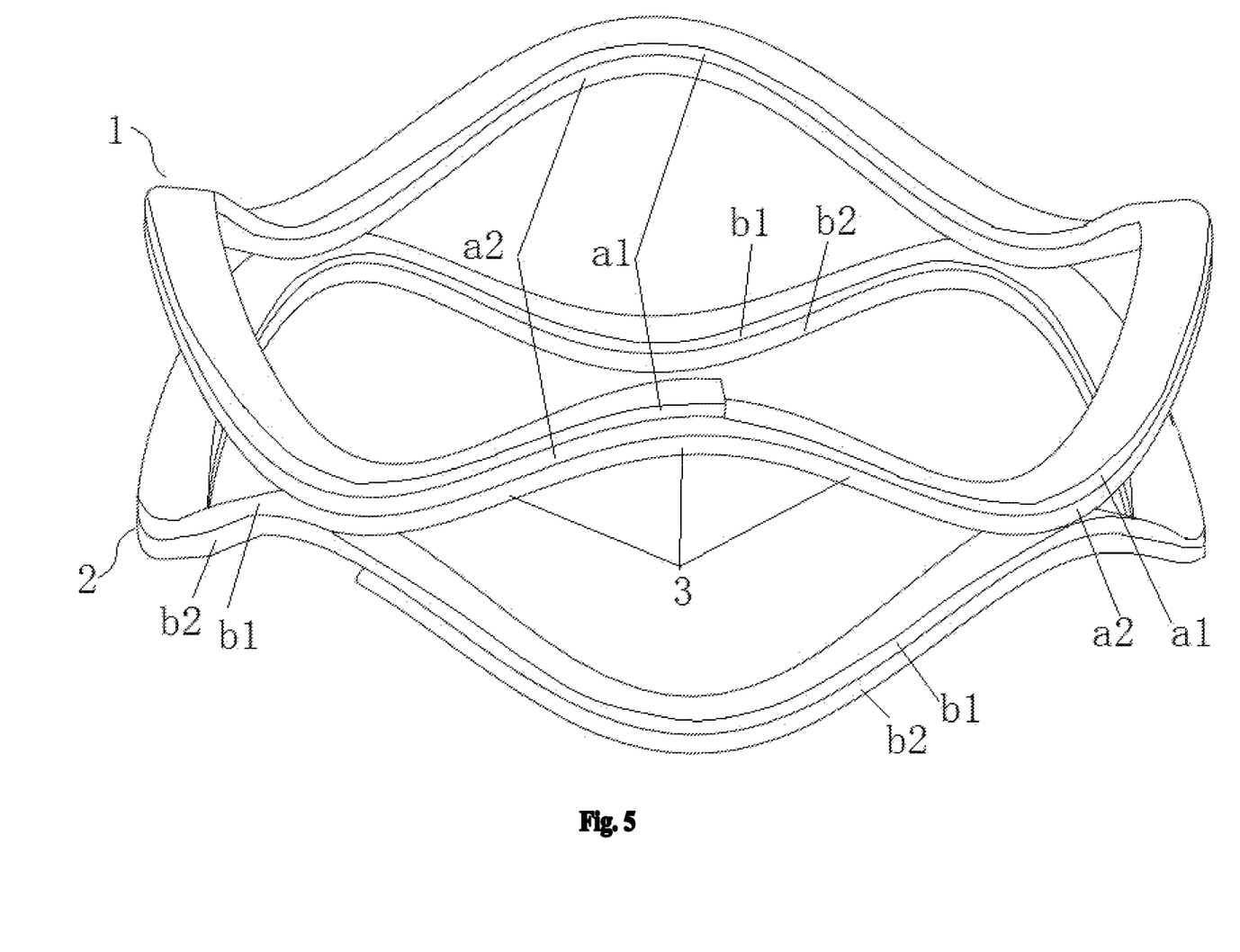
FIG. 5 is a perspective view of a third embodiment of a superimposed opposing wave spring of the present application.
Figure 6:
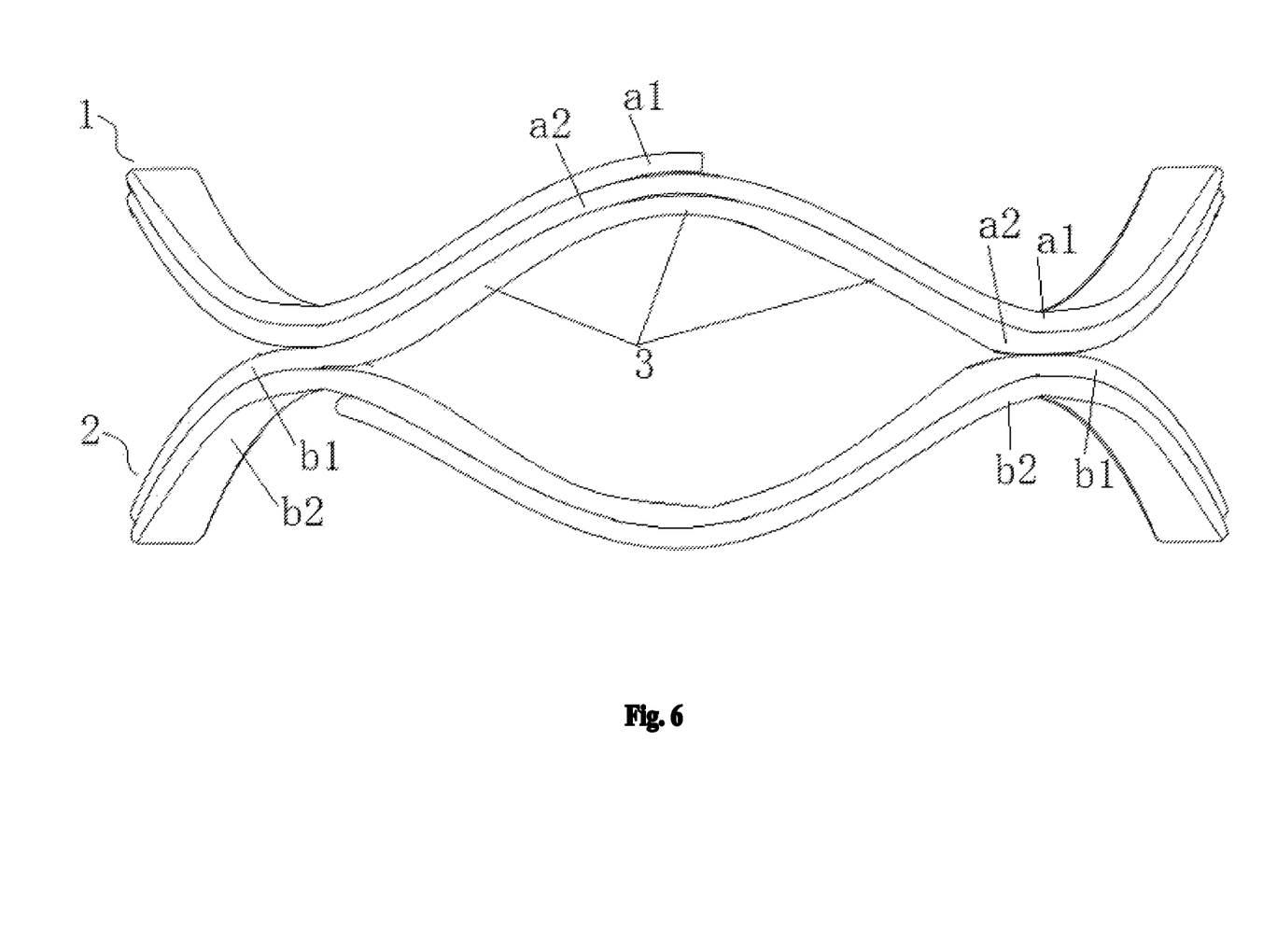
FIG. 6 is a front view of FIG. 5.

As an alternative embodiment, as shown in FIG. 5 and FIG. 6, the connection spring part 3 has a half-wave shape closely fitting to the upper or lower superimposed-layer wave spring unit.

As alternative embodiments, the total number of the connection spring parts 3 can be 1, 2, 3 or more.

As an alternative embodiment, one end of the connection spring part 3 can be welded to the bottom layer of the upper superimposed-layer wave spring unit, and the other end of the connection spring part 3 can be connected to the second wave crest 21 of the top layer of the lower superimposed-layer wave spring unit.

The present application provides a superimposed opposing wave spring which comprises a plurality of superimposed-layer wave spring units and connection spring parts 3, the inventor skillfully designs a configuration wherein two adjacent superimposed-layer wave spring units, which are stacked one above the other, are interconnected by a connection spring part 3, and the two adjacent superimposed-layer wave spring units respectively have a first wave trough 11 and a second wave crest 21 that are abutting each other with opposing apexes, and respectively have a first wave crest 12 and a second wave trough 22 that are arranged across from each other in an upper position and a lower position, so that the superimposed opposing wave spring has larger elastic performance and a higher available stroke while ensuring better verticality; in addition, under the condition that thickness of the entire material is not changed, the stiffness of the wave spring can be improved by increasing the number of layers of the superimposed-layer wave spring units, and by changing the number of layers of the superimposed-layer wave spring units, various wave springs with different stiffness can be produced, and thus the wave spring can have variable stiffness characteristics to meet different needs of customers.

Apparently, the above embodiments are only examples illustrated for clearly describing the present application, and are not intended to limit the implementation ways thereof. Other variations and modifications in other different forms can be made by a person skilled in the art in light of the above description. There is no need and no way to exhaustively list all embodiments herein. And any obvious variations or modifications derived from the above description are intended to be embraced within the protection scope of the present application.

The invention claimed is:

1. A superimposed opposing wave spring, comprising:
   a plurality of superimposed-layer wave spring units, wherein each layer in each superimposed-layer wave spring unit is formed by spirally bending around an axis into a wave shape, and waveforms of the respective layers in each superimposed-layer wave spring unit are arranged to overlap each other;
   at least one connection spring part, which connects two adjacent superimposed-layer wave spring units that are stacked one above the other, so that the two adjacent superimposed-layer wave spring units respectively have a first wave trough and a second wave crest that are abutting each other with opposing apexes, and respectively have a first wave crest and a second wave trough that are arranged across from each other in an upper position and a lower position
   wherein, the plurality of the superimposed-layer wave spring units and the connection spring part are integrally formed by winding a same flat metal wire.

2. The superimposed opposing wave spring according to claim 1, wherein, the connection spring part is disposed between the first wave crest and the second wave trough, which are arranged across from each other, of the two adjacent superimposed-layer wave spring units, one end of the connection spring part is connected to the first wave trough at a bottom layer of the upper superimposed-layer wave spring unit, and the other end of the connection spring part connected to the second wave crest at a top layer of the lower superimposed-layer wave spring unit.

3. The superimposed opposing wave spring according to claim 1, wherein, the connection spring part comprises a first segment in a fitting connection with the bottom layer of the upper superimposed-layer wave spring unit, a second segment in a fitting connection with the top layer of the lower superimposed-layer wave spring unit, and an oblique line segment connecting the first segment and the second segment.

4. The superimposed opposing wave spring according to claim 3, wherein, the oblique line segment is connected with both the first segment and the second segment at connection portions that have arc transition.

5. The superimposed opposing wave spring according to claim 3, wherein, the first segment and the second segment have lengths that are both ⅙-¼ of a length of one wave of the wave shape.

6. The superimposed opposing wave spring according to claim 1, wherein, the connection spring part has a flat line shape.

7. The superimposed opposing wave spring according to claim 1, wherein, the connection spring part has a half-wave shape closely fitting to the upper or lower superimposed-layer wave spring unit.

8. The superimposed opposing wave spring according to claim 1, wherein, the wave shape is sinusoidal.

9. The superimposed opposing wave spring according to claim 8, wherein, each layer in each superimposed-layer wave spring unit comprises at least two sine waves.

* * * * *